United States Patent
Otani

(10) Patent No.: US 8,413,190 B2
(45) Date of Patent: Apr. 2, 2013

(54) TELEVISION RECEIVER

(75) Inventor: Kazuhiro Otani, Ikoma (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 273 days.

(21) Appl. No.: 12/386,788

(22) Filed: Apr. 22, 2009

(65) Prior Publication Data

US 2010/0275232 A1     Oct. 28, 2010

(51) Int. Cl.
*H04N 5/445* (2011.01)
*H04N 7/16* (2011.01)

(52) U.S. Cl. .............. 725/45; 725/40; 725/46; 725/47; 725/136

(58) Field of Classification Search .......... 725/37, 725/40, 46, 47, 136
See application file for complete search history.

(56) References Cited

U.S. PATENT DOCUMENTS

| | | | |
|---|---|---|---|
| 7,694,319 B1 * | 4/2010 | Hassell et al. .................. 725/34 |
| 7,886,320 B2 * | 2/2011 | Heughebaert et al. .......... 725/37 |
| 2005/0102177 A1 * | 5/2005 | Takayama ....................... 705/14 |
| 2007/0124752 A1 * | 5/2007 | Sakai ................................ 725/8 |
| 2008/0167943 A1 * | 7/2008 | O'Neil et al. .................... 705/10 |

FOREIGN PATENT DOCUMENTS

JP     2006-352378     12/2006

* cited by examiner

*Primary Examiner* — Kieu Oanh T Bui
(74) *Attorney, Agent, or Firm* — Masuvalley & Partners

(57) ABSTRACT

The present invention relates to a television receiver having a display to indicate a banner thereon, and a controller to adjust a position of the banner on the display. Further, the controller is capable of adjusting the position of the banner on the display according to television program information received.

8 Claims, 7 Drawing Sheets

TELEVISION RECEIVER

TECHNICAL FIELD

The present invention relates to a television receiver capable of automatically or manually moving a banner, which is indicated on a display, to a position where the banner does not interfere with the view.

BACKGROUND OF THE INVENTION

Presently, many television receivers in various types which indicate a banner on a display, are used in households. Although these television receivers indicate the banner on the displays, the banner can not be moved on the display.

Normally, when a viewer watches a television receiver, the display of the television receiver indicates subtitles or text displays of a television program to be broadcasted. The display also indicates various scores, telops and the like according to the contents of the television program. Conventionally, there was no television receiver capable of moving a banner on a display. Therefore, there has been an issue where viewers can not read text displays or scores, or it is difficult for the viewers to read the text displays or the scores because the banner is overlapped on the text displays or the scores.

Further, the positions for displaying the subtitles or the text displays, and the scores, telops or the like are different depending on the contents of the television program. Also, methods for those indications, or the types of the indication are different. Thus, the banner positions that interfere with the view are generally different depending on the contents of the television programs. Therefore, a television receiver, which is capable of changing the banner position according to the program contents, has been desired. Further, there has been a need for a television receiver capable of automatically moving a banner to a position, which does not interfere with the view without having a viewer to move the banner.

SUMMARY OF THE INVENTION

One feature of the present invention is a television receiver having a display, which indicates a banner thereon, and a controller, which adjusts a position of the banner on the display.

By employing the above-described configuration, the banner position on the display can be moved automatically or manually. Normally, subtitles or text displays in a TV program, and various scores, telops or the like according to the programs contents are indicated on displays. Conventionally, banners could not be moved on the display. Therefore, there has been an issue where these text displays or the scores are overlapped on the banner and the viewer can not read the text displays or scores, or it is difficult for the viewers to read the text displays or the scores. According to the television receiver pertaining to the present invention, the banner can be moved to a different position when the text displays or the scores are overlapped on the banner. Therefore, the viewers have no such problem. Further, a configuration can be made so as to automatically move the banner position when such a problem with the view occurs, without having the viewer manually change the banner position. Further, a configuration may be made so as to manually move the banner position by the viewer. Therefore, the banner position preferable to the viewer can also be provided.

Further, one of the features of the present invention may be a television receiver having a display, which displays a television program with a banner thereon, a controller, which receives a signal of television program information and determines a position of the banner on the display according to the signal of the television program information.

By employing the above-described configuration, the banner position on the display can be moved automatically or manually. Normally, subtitles or text displays and various scores or telops according to the programs contents are indicated on displays. Conventionally, banners could not be moved on the displays. Therefore, these text displays or the scores are overlapped on the banner which causes the problem that the viewer can not read the text displays or scores or it is difficult for the viewers to read the text displays or the scores. According to the television receiver pertaining to the present invention, the banner can be moved to a different position when the text displays or the scores are overlapped on the banner. Therefore, the viewers have no such problem. Further, the configuration can be made so as to automatically move the banner position when such a problem with the view occurs, without having the viewer manually change the banner position. Further, the configuration may be made so as to manually move the banner position by the viewer. Therefore, the banner position preferable to the viewer can be also provided. Depending on the contents of the television program, subtitles or text displays, and the scores, telops and the like are displayed on different positions. Also, methods for those indications, or the types of the indication itself are different. Thus, the banner positions that interfere with the view are generally different depending on the contents of the television programs. That is, there may be a case where the banner on a certain position can easily be viewed for a certain television program. Therefore, according to the present invention, the banner position can be adjusted for each television program to the position, which can easily be viewed.

Normally, the banner does not interfere with the view when the banner is moved to a position of sidebar in a case when a screen size setting of a television receiver is in a full-mode (which is a general initial setting) and an aspect ratio of the receiving image signal is about 4:3 (image ratio of horizontal width/vertical width is about 4/3). Meanwhile, the banner is indicated on a predetermined position in a case when an aspect ratio of the receiving image signal is about 16:9. The television receiver of the present invention is designed so as to move the banner to a position of sidebar in a case when an aspect ration of receiving image signal is about 4:3.

Normally, most image signals transmitted from sources to television receivers are the image signals with about 4/3 or about 16/9 of the image ratio of horizontal width/vertical width. The screen size of television receivers are normally set to a full-mode. In such a case, when the television receivers receive an image signal of about 4/3, the image is projected as an image of about 16/9 by adding sidebars on the left and the right sides of the image. Meanwhile, when the television receivers receive the image signal of about 16/9, the image is indicated on the screen in the image ratio as received without adding the sidebars. Because the sidebars are indicated on the screen when the television receivers receive the image signal of about 4/3, there is an advantage in the present invention that the banner will not interfere with the view by indicating the banner on the position of the sidebars.

Further, one of the features of the present invention may be a television receiver having a processor, which receives a signal of an image and sound data and extracts television program information from the image and sound data, a controller, which receives a signal of the television program information from the processor to adjust a position of a banner according to an analytical result of the signal of the television program information, and a display, which receives a signal of the position of the banner from the controller to indicate the banner on the display.

By employing the above-described configuration, the banner position on the display can be moved automatically or manually. Normally, subtitles or text displays in a television program and various scores or telops according to the programs contents are indicated on displays. Conventionally, banners could not be moved on the displays. Therefore, these text displays or scores are overlapped on the banner which causing the problem that the viewer can not read the text displays or the scores, or it is difficult for the viewers to read the text displays or scores. According to the television receiver pertaining to the present invention, the banner can be moved to a different position when the text displays or the scores are overlapped on the banner. Therefore, the viewers have no such problem. Further, the configuration can be made so as to automatically move the banner position when such a problem with the view occurs, without having the viewer manually change the banner position. Further, the configuration may be made so as to manually move the banner position by the viewer. Therefore, the banner position preferable to the viewer can be also provided. Depending on the contents of the television program, subtitles or text displays, and the scores, telops and the like are displayed on different positions. Also, methods for those indications, or the types of the indication itself are different. Thus, the banner positions that interfere with the view are generally different depending on the contents of the television programs. That is, there may be a case where the banner on a certain position can easily be viewed for a certain television program. Therefore, according to the present invention, the banner position can be adjusted for each television program to the position, which can easily be viewed.

DETAILED DESCRIPTION OF INVENTION

Figure 1:
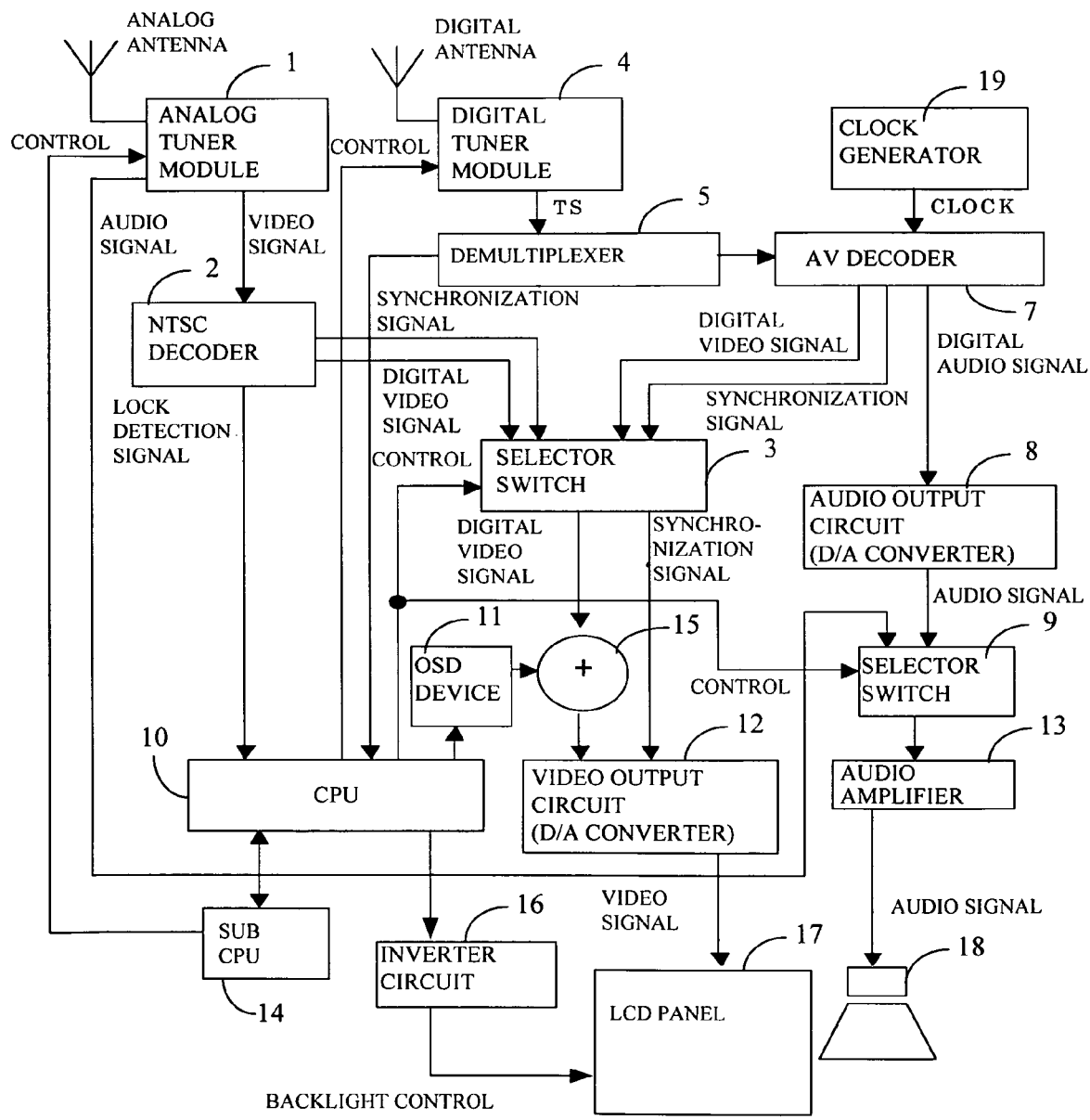
FIG. 1 is a block diagram illustrating an example of a television receiver of the present invention.

FIG. 1 is a block diagram illustrating a television receiver which is capable of receiving an analog broadcast and digital broadcast.

A digital antenna is arranged outdoor facing to a predetermined direction. The digital antenna receives a digital broadcast signal and inputs it to a digital tuner 4. Further, an analog antenna receives an analog signal and gives it to an analog tuner 1.

The digital tuner 4 picks up a signal with a specific frequency from a high-frequency digital modulated signal containing picture/audio data. Further, by having a demodulation circuit, a reverse interleave circuit, an error correction circuit etc., the digital tuner 4 outputs a transport stream by demodulating the selected digital modulated signal.

A demultiplexer (DEMUX) 5 inputs a transport stream from the tuner 4 based on an instruction of a CPU 10, and separates it into a video steam of MPEG2 (Moving Picture Experts Group 2), an audio stream and PSI/SI (Program Specific Information/Service Information) being adjunct information. The demultiplexer 5 selects video/audio stream of a digital broadcast from the instruction of the CPU 10, supplies them to an AV decoder 7 and supplies program information contained in the PSI/SI (ex. name of the program, starting time of the program, duration of the program, contents information of the program, genre information of the program) to the CPU 10. The analog tuner 1 picks up an audio signal and video signal from the signal received from the antenna. The video signal that is picked up is transmitted to a NTSC decoder 2. The audio signal that is picked up is outputted from a speaker 18 through an audio amplifier 13 after transmitted to a selector switch 9.

The AV decoder 7 is provided with a video decoder for decoding a video stream and an audio decoder for decoding an audio stream. The video decoder decodes the inputted variable-length code to obtain a quantized coefficient or a motion vector, and performs a motion-compensated control etc. based on a reverse-DCT conversion or the motion vector. The audio decoder decodes the inputted code signal to generate an audio data. The video data generated by decoding is outputted to a video output circuit 12 through a selector switch 3 and the audio data is outputted to the audio output circuit 8.

The video output circuit 12 receives the video data and performs D/A (digital/analog) conversion to convert the video data into an analog RGB signal, for example. The audio output circuit 8 receives the audio data outputted from the AV decoder 7 and performs D/A conversion to generate an analog signal of right (R) sound and left (L) sound and an analog signal of main sound and sub sound.

Further, the video output circuit 12 and audio output circuit 8 are provided with an output resistance, an amplifier, etc. The AV output terminal that receives a signal from the video output circuit 12 and audio output circuit 8 is provided with an output section (a set of left/right audio output terminals or a video output terminal), and a LCD panel 17 and speaker 18 are connected to this output section through a video/audio cord. In addition, the audio signal from the audio output circuit 8 is converted into sound by being transmitted to the speaker 18 after the audio signal has been transmitted to the audio amplifier 13 through the selector switch 9.

An OSD (on-screen display) device 11 generates a video data based on the character information or color information outputted and instructed from the CPU and outputs the data to an adder 15. The adder 15 performs a process to incorporate the video data into the received video data outputted from the AV decoder 7. This OSD device 11 can display an electronic program guide, a menu screen and various setting screens (channel setting screen etc.). A clock generator 19 controls the time treated in the television receiver.

Figure 2:
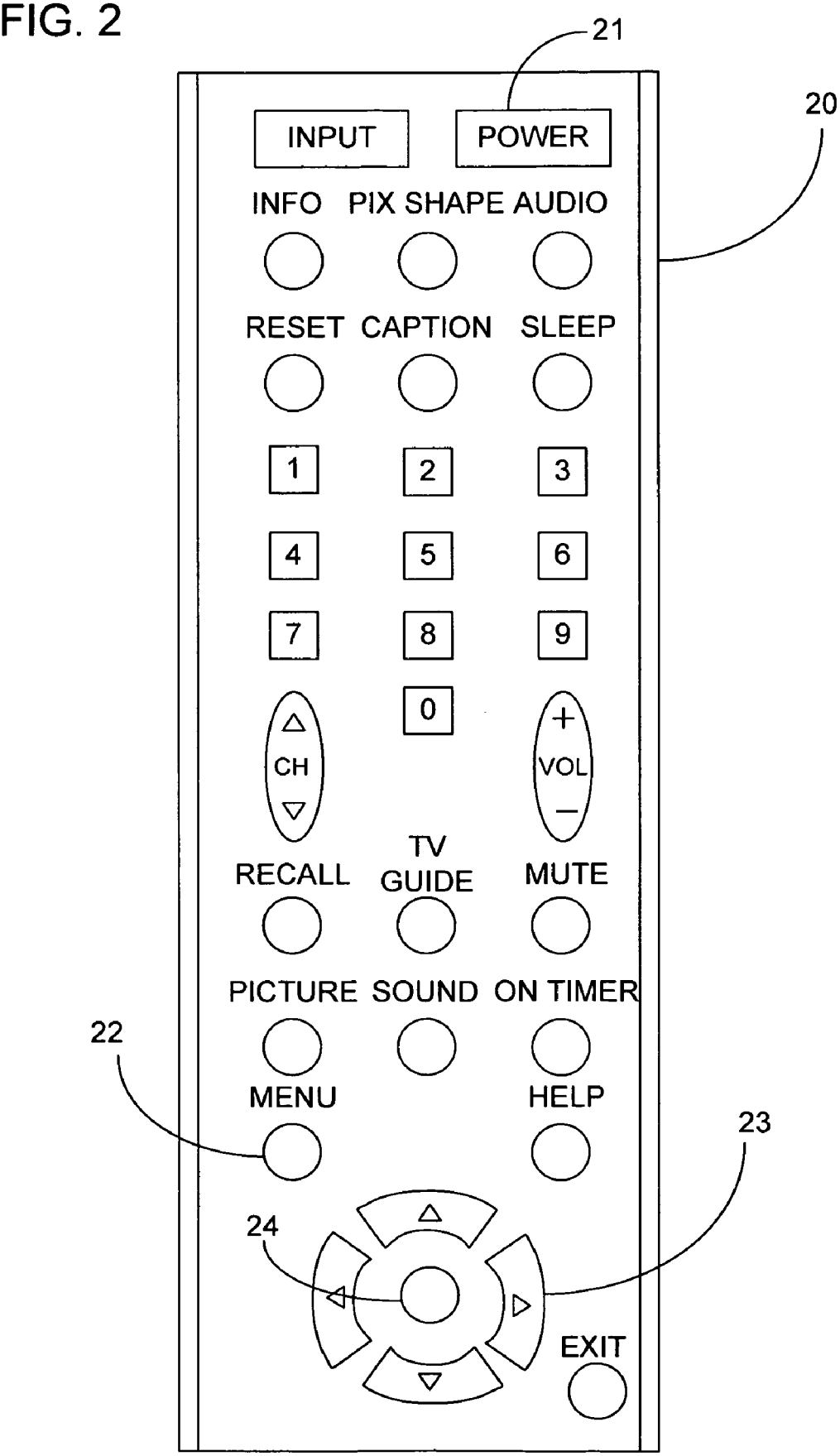
FIG. 2 is a diagram illustrating an example of a remote controller which is used to remotely operate a television receiver of the present invention.

A remote transmitter (remote controller) 20 is provided with various keys as shown in FIG. 2 to transmit various instructions to the television receiver. When operating the key, a signal light (remote control signal) which is an instruction corresponding to that key, is transmitted from a light emitting section. A SUBCPU 14 receives the signal light, converts this into an electric signal, and transmits it to the CPU 10. The SUBCPU 14 operates as a controller for a television receiver. For example, it is used to control a stand-by state of a television receiver, or acts as a remote control receiver. An inverter circuit 16 transmits the signal received from CPU 10 to LCD panel 17, and plays a role of converting the direct current to the alternating current.

In a memory (for example, RAM, EEPROM, a flash memory, etc.) (not shown), a channel information (frequency information, information such as a channel list corresponding to number keys) and various setting information are stored in addition to the information (program information) for displaying EPG (electronic program guide) screen.

The CPU 10 is to perform overall control of this digital television receiver. Particularly, as the processes related to the present invention, a channel information obtaining process, channel preset setting, channel skip setting and a channel selection process and a setting process etc. corresponding to the key operation of the remote control transmitter 20 are performed.

Next, the remote controller which is capable of operating the television receiver pertaining to the present invention will be explained. FIG. 2 illustrates an example of the remote controller 20 which can be used in the present invention. The remote controller 20 is provided with various input buttons, such as a POWER 21, a MENU 22, a Cursor Operating Key 23 and an ENTER 24. The power of the television receiver can be turned on or off by the POWER 21. Further, by the MENU 22, it becomes possible to enter into a screen, in which various settings of the television receiver (picture setting, audio setting etc.) can be changed. Since various options are displayed on the screen when entering into the menu screen, a user moves a cursor to those options by using the cursor operating key 23 and pressing the ENTER 24 to select the option. The operating method of the remote controller pertaining to the present invention is not specifically limited. However, the remote controller may normally be used by the method described above.

The concrete examples of the television receiver pertaining to the present invention have been explained above. However, the present invention is not limited to the subjects relate to these concrete examples. Cathode-ray tube televisions, liquid crystal televisions, plasma televisions, projection televisions, video projectors, organic EL (Electro Luminescence) televisions, etc. are included in the television receiver pertaining to the present invention. Further, types or arrangements for the components in the television receiver are not limited as long as pictures are projected on the display. Further, the television receiver does not need to be provided with the remote controller in the form described above. And the television receiver may have a remote controller in a different form or may not have a remote controller.

Figure 3:
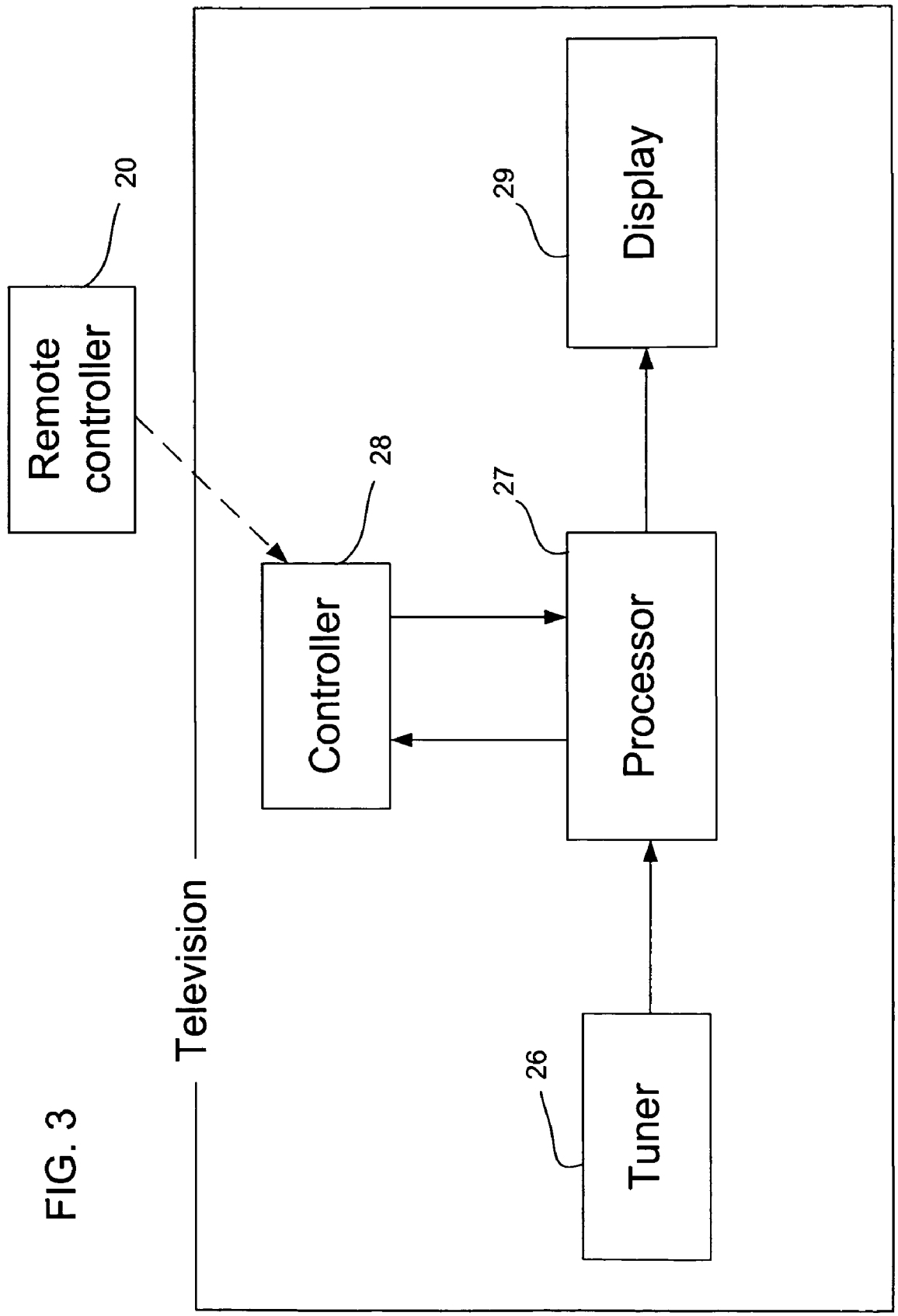
FIG. 3 is a block diagram illustrating an example of elements provided to a television receiver of the present invention.

Next, characteristic portions of the television receiver pertaining to present invention will be concretely explained with reference to FIGS. 3 through 7. FIG. 3 is a block diagram illustrating elements provided to the television receiver pertaining to the present invention. In the present invention, firstly, a tuner 26 receives a digital broadcast signal or an analog broadcast signal. These signals contain picture and audio data. These signals are transmitted to a processor 27. The processor 27 performs an operation to pick up the image data and audio data from the signal after receiving the signal. Further, the processor 27 performs a process for obtaining a signal of the television program information to be shown on the display from the signal. The signal of television program information picked up by the processor 27 is transmitted to the controller 28. Here, the signal of television program information include the genre of the television program, the name of the television program, the starting time of the television program, the ending time of the television program, the information on a channel to which the television program belongs to, the television station creating the television program, and the sponsors of the television program.

The controller 28 picks up predetermined data according to the signal when the controller 28 receives the signal of the television program information. That is, the controller 28 picks up the data of the genre information of the television program. Then, the controller 28 recognizes the genre information of the television program being picked up, and determines a position to indicate a banner on a display of the television receiver according to the information. Thereafter, the controller 28 transmits the control signal relating to the banner position to the processor 27, and then the control signal is transmitted to a display 29. After recognizing the signals for image data and audio data and the signal for banner position that are received from the processor 27, the display 29 projects the television program image, and indicates the banner on the position, to which the controller 28 determined. Because the controller 28 determines the banner position on the display by recognizing the television program information described above, a viewer will not be interfered with the view by the banner.

Because the controller 28 recognizes the genre information of the television program, it is possible to indicate the banner in a position where the banner does not interfere with the view of the viewer when the program contents belonging to the genre is indicated on the display. For example, in a case when the television program to be broadcasted on the display is a Japanese professional baseball game, the banner can be indicated on the lower left side on the display viewed from viewers. This is because scores are indicated on the lower right side of the display viewed from viewers in the Japanese professional baseball broadcastings, thus, placing the banner on the lower left side on the display will avoid the banner indication from overlapping on the score indication on the display. Meanwhile, in a case when the television program to be broadcasted on the television receiver is an American Major League Baseball game, the banner can be indicated on the lower left side on the display viewed from viewers. This is because scores are indicated on the upper left side of the display viewed from viewers in the American Major League Baseball broadcastings, thus, placing the banner on the lower left side on the display will avoid the banner indication from overlapping on the score indication on the display.

Meanwhile, in a case when the television program to be broadcasted on the television receiver, is a volleyball game, the banner can be indicated on the lower right side on the display viewed from viewers. This is because scores are indicated on the upper left side on the display viewed from viewers in the volleyball game, thus, placing the banner on the lower left side on the display will avoid the banner indication from overlapping on the score indication on the display. On the other hand, in a case when the television program to be broadcasted on the television receiver is a news or a variety program, the banner can be indicated on the lower right side on the display viewed from viewers. This is because telops are usually inserted near an upper center or a lower center position on the display viewed from viewers in the news or the variety show, thus, placing the banner on the lower right side on the display will avoid banner from overlapping on the ticker on the display. As described in the concrete examples above, the viewer can watch the television image without interference by moving the banner position on the display according to the television program.

Here, genres of the television programs may be categorized into drama, variety show, movie, music, animation, sports, news, theater, documentary, life, and the like, for example. Further, the drama may be categorized into Japanese drama, foreign drama, period drama and the like. The variety show can be categorized into variety show, quiz show, talk show and the like. The movie can be categorized into foreign film, Japanese film, anime, and the like. Music can be categorized into rock, pops, classic, opera, jazz, concert, live performance, and the like. The animation can be categorized into amine, action hero, and the like.

The sports may be categorized into soccer, baseball, golf, sumo wrestling, motor sports, tennis, basket ball, boxing, professional wrestling, marathon, track & field, swimming, volleyball, rugby, American football, horse race, martial arts, marine sports, winter sports, Olympics, international competitions, and the like. The news may be categorized into news, politics, economics, weather and the like. The theater may be categorized into Kabuki, Rakugo (Japanese sit-down comedy), and the like. The documentary may be categorized into social, history, nature, space, culture, literature and the like. The life can be categorized into travel, health, cooking, shopping channel, language, education and the like. Upon recognizing which category of these genres, the controller can move the banner where the banner does not interfere with view, when the television program of the recognized category is broadcasted on the display.

Further, as a banner pertaining to the present invention, a banner for indicating time, a banner for indicating a channel for a program, a banner for indicating date, and a banner for indicating a condition of the television receiver, may be listed, for example. Further, the banner pertaining to the present invention may be a display for advertising or promoting goods and services. Further, the banner may be a display for introducing another website on the web. The banner pertaining to the present invention may be used for a hyperlink to a website. Furthermore, as the name of the television program pertaining to the present invention, "Professional baseball Hanshin Tigers vs. Yomiuri Giants" and the like may be listed as an example. Further, the position of the banner which is indicated on the display is not specifically limited. For example, in a case of a square-type display, the position may be upper right, lower right, upper left, lower left, upper side, lower side, left side, right side, upper center, lower center, or the like, as long as the position does not interfere with the view.

In addition, FIG. 3 is a concrete example illustrating the television receiver pertaining to the present invention. However, the configuration of the television receiver is not limited to the example. For example, the television receiver may be designed to have a tuner 26, a controller 28, and a display 29. And the controller 28 may be design to function as a processor 27. In such a case, the controller 28 receives a television program information signal, and determines a position for displaying the banner based on the signal. Further, the television receiver pertaining to the present invention may further be provided with a remote controller 20. Viewers can transmit various instructions to the television receiver body by using the remote controller. The viewer can also transmit a signal to instruct a position for displaying the banner by using this remote controller. In such a case, the controller operates according to the instruction from the viewer with no relation to the television program information.

A feature of the present invention is to be able to move the banner position on the display of the television receiver, or to be able to select whether or not to indicate a banner on the display. Whether or not to indicate the banner on the display may be determined by a viewer. The viewer can transmit an instruction to the controller 28 by using the remote controller, or the television receiver body can transmit an instruction to the controller 28. Meanwhile, in a case when a banner is indicated on the display, the position may be determined by a viewer or the position may be automatically determined by the controller 28. In the case when the controller 28 automatically determines the banner position, the determination may be made based on the television program information described above.

Figure 4:
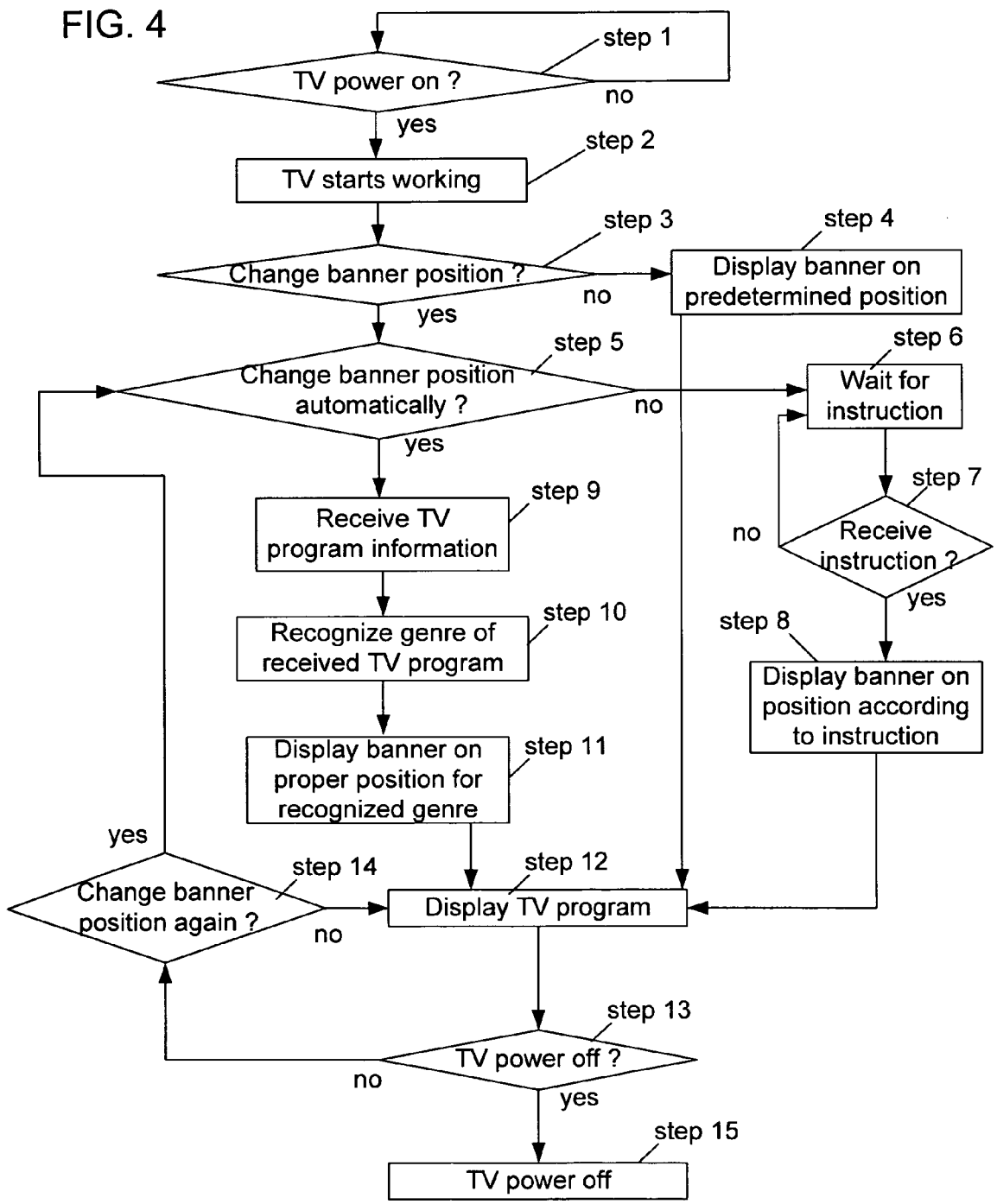
FIG. 4 is a flow chart illustrating a basic operation performed by a television receiver pertaining to the present invention.

Next, an operation performed by a television receiver pertaining to the present invention will be concretely explained with reference to flow charts in FIGS. 4, 5, 6, and 7. FIG. 4 is a flow chart illustrating basic operations performed by the television receiver pertaining to the television receiver. The television receiver starts operating corresponding to the operation to turn the power on (steps 1 and 2). When the television receiver starts the operation, the controller determines whether or not, the position of the banner on the display is changed (step 3). When the controller determines that the position of the banner is not changed, the banner is displayed on a predetermined position (step 4). When the controller determines that the position of the banner is changed, the controller determines whether the position of the banner is automatically changed or not (step 5). When the controller determines that the banner position is not automatically changed, the controller waits for an instruction from a viewer (step 6). When the controller receives the instruction from the viewer, the controller displays the banner on the position which is instructed (step 7 and step 8). In such a case, the controller waits until the instruction from the viewer is received (Step 7 and Step 6).

Meanwhile, when the controller determines that the banner position is changed automatically, the controller receives the television program information (step 9). Then, the controller recognizes a genre of the program from the television program information (step 10). The controller displays the banner at the position which does not interfere with view, based on the genre of the program recognized (step 11). When the display position of the banner on the display is determined in step 4, step 8 or step 11, the television program, as well as the banner is shown on the display (step 12). After the television program is broadcasted, the controller determines whether the power of the television receiver is turned off or not (step 13). When the power of the television is determined to be not turned off, the controller determines whether the banner position is changed again or not (step 14). When the controller determines that the banner position is changed again, the step returns to step 5. In the step, the controller determines whether the banner position is changed automatically or not (step 5). When the controller determines that the operation to turn off the power of the television is performed, the power of the television is turned off and the television receiver ends the operations (step 15).

Figure 5:
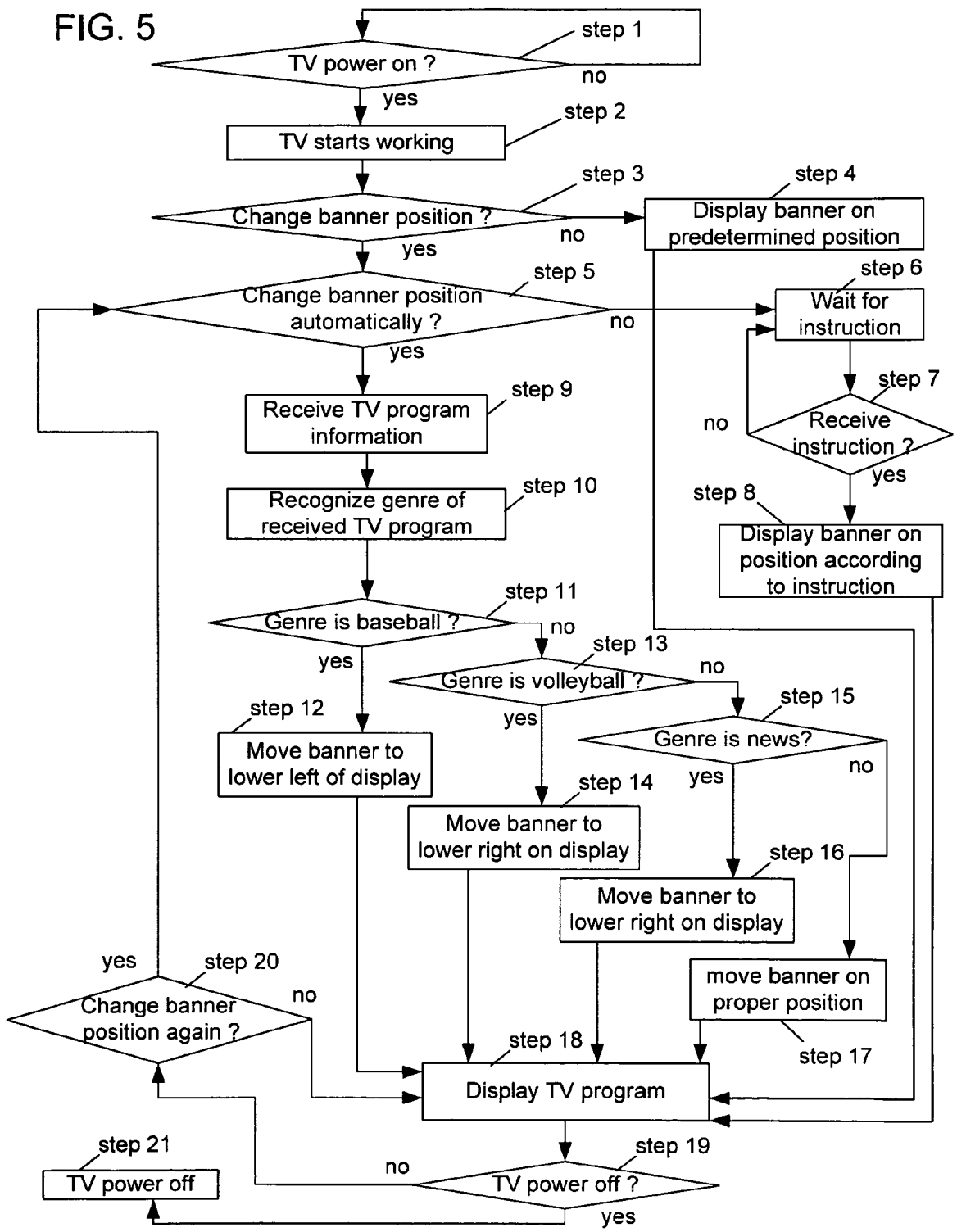
FIG. 5 is a flow chart illustrating an example of operations performed by a television receiver pertaining to the present invention.

Next, another operation performed by the television receiver pertaining to the present invention will be explained with reference to a flow chart of FIG. 5. In FIG. 5, step 1 through step 10, and step 18 through step 21 are the same as the operations illustrated in FIG. 4. In FIG. 5, when the controller recognizes a genre of the television program (step 10), the controller firstly determines whether the genre is baseball or not (step 11). When the controller determines that the genre of the television program is baseball, the controller moves the banner position on the display to lower left side (step 12). Then a baseball program is shown on the display (step 18). When the controller determines that the genre of the television program is not baseball, the controller determines whether the genre is volleyball or not (step 13). When the genre is determined to be volleyball, the controller moves the banner position on the display to lower right (step 14). Then, a volleyball program is projected on the display (step 18).

Meanwhile, when the controller determines that the genre of the television program is not volleyball, the controller determines whether the genre is news or not (step 15). When the genre is determined to be news, the controller moves the banner position to lower right (step 16). Then a news program is projected on the display (step 18). Finally, when the controller determines that the genre of the television program is not news, the controller moves the banner to a predetermined appropriate position (step 17). Then, a predetermined program is projected on the display (step 18).

In addition, the types of the television program in FIG. 5 are not limited to three example described above. Any of the examples of the television programs may be used. Further, the number of the genre of the television program, which the controller recognizes, is not limited to three. The number of the genre may be not more than two, or not less than 4. The number of genres of the television program that is recognized by the controller is preferably about 6 to 12, and more preferably about 8 to 10, based on a stand point of setting the television receiver capable of moving the banner position to an appropriate position for the total television programs that are normally broadcasted. Further, the subject of the recognition for the controller to adjust the banner position is not limited only to the television programs. The subject may be any of the television program information described above.

Further, there may be cases where the appropriate banner positions are different even in the same television program genre. To adjust this difference, the controller may be configured to move the banner within the same program genre by a predetermined time. That is, there is a case where the program genre is the news, but the appropriate banner positions are different for the morning time, the day time and the evening time. Therefore, the controller can move the banner by the time as follows: for example, the banner position can be moved to lower left in the morning time; the banner position can be moved to upper left in the day time; and the banner position can be moved to lower right in the evening time. The time referred here may be a period of time in the morning or the afternoon, by day, or by hour.

Figure 6:
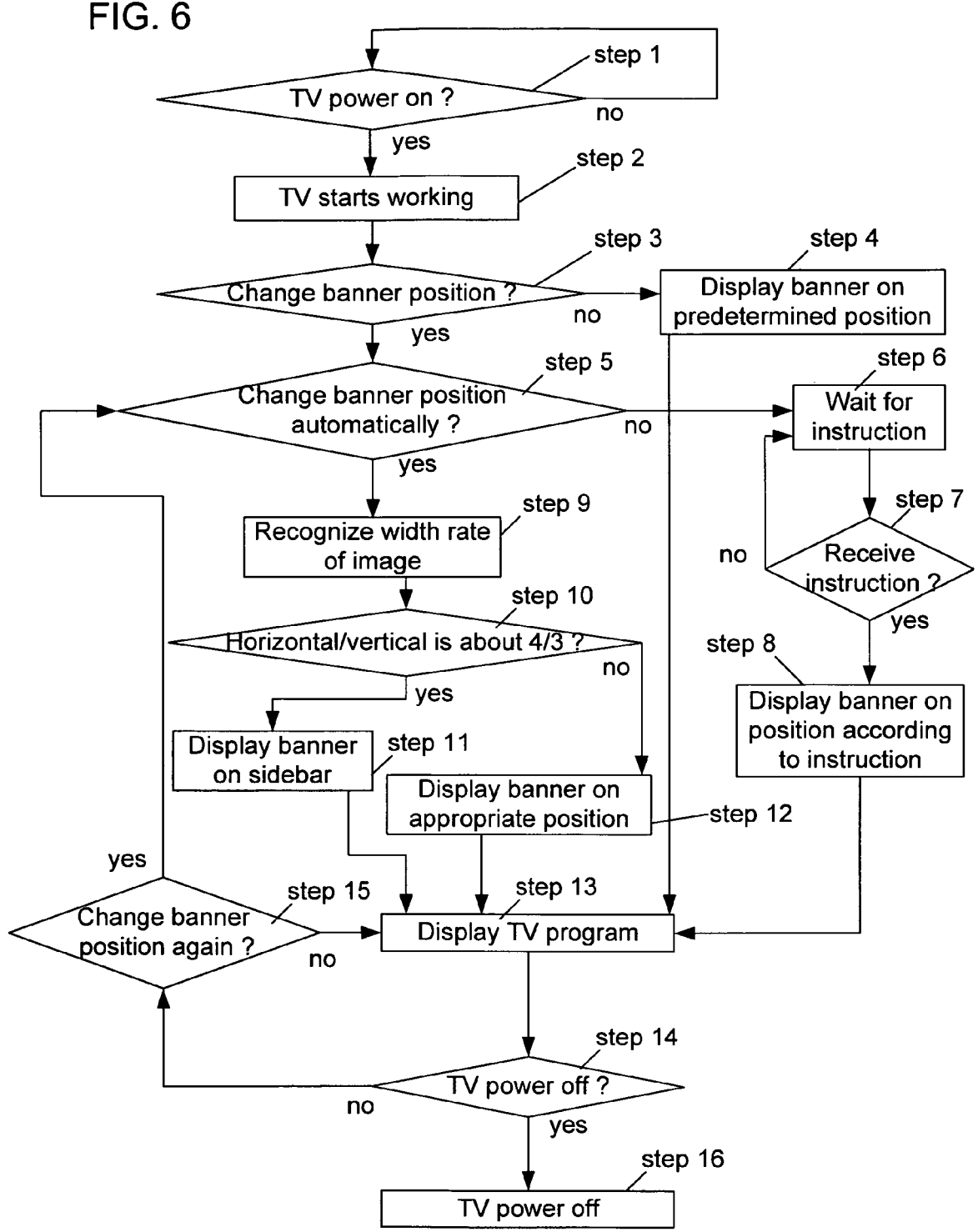
FIG. 6 is a flow chart illustrating an example of operations performed by a television receiver pertaining to the present invention.

Next, another operation performed by a television receiver pertaining to the present invention will be explained with reference to a flow chart of FIG. 6. In FIG. 6, step 1 through step 8 and step 13 through 16 are the same as the operation illustrated in FIG. 4. When the controller determines that the banner position is automatically adjusted, the controller recognizes an image ratio of horizontal width/vertical width for the image projected on the display (step 9). Then the controller determines whether the image ratio of horizontal width/vertical width is about 4/3 or not (step 10). When the image ration is a value about 4/3, the controller moves the banner to the position of sidebar on the display (step 11). Then, the banner, as well as the television program is projected on the display (step 13). Meanwhile, when the image ratio is not a value of about 4/3, the controller determines the banner position to a predetermined position (step 12). Then the banner, as well as the television program is projected on the display (step 13).

Figure 7:
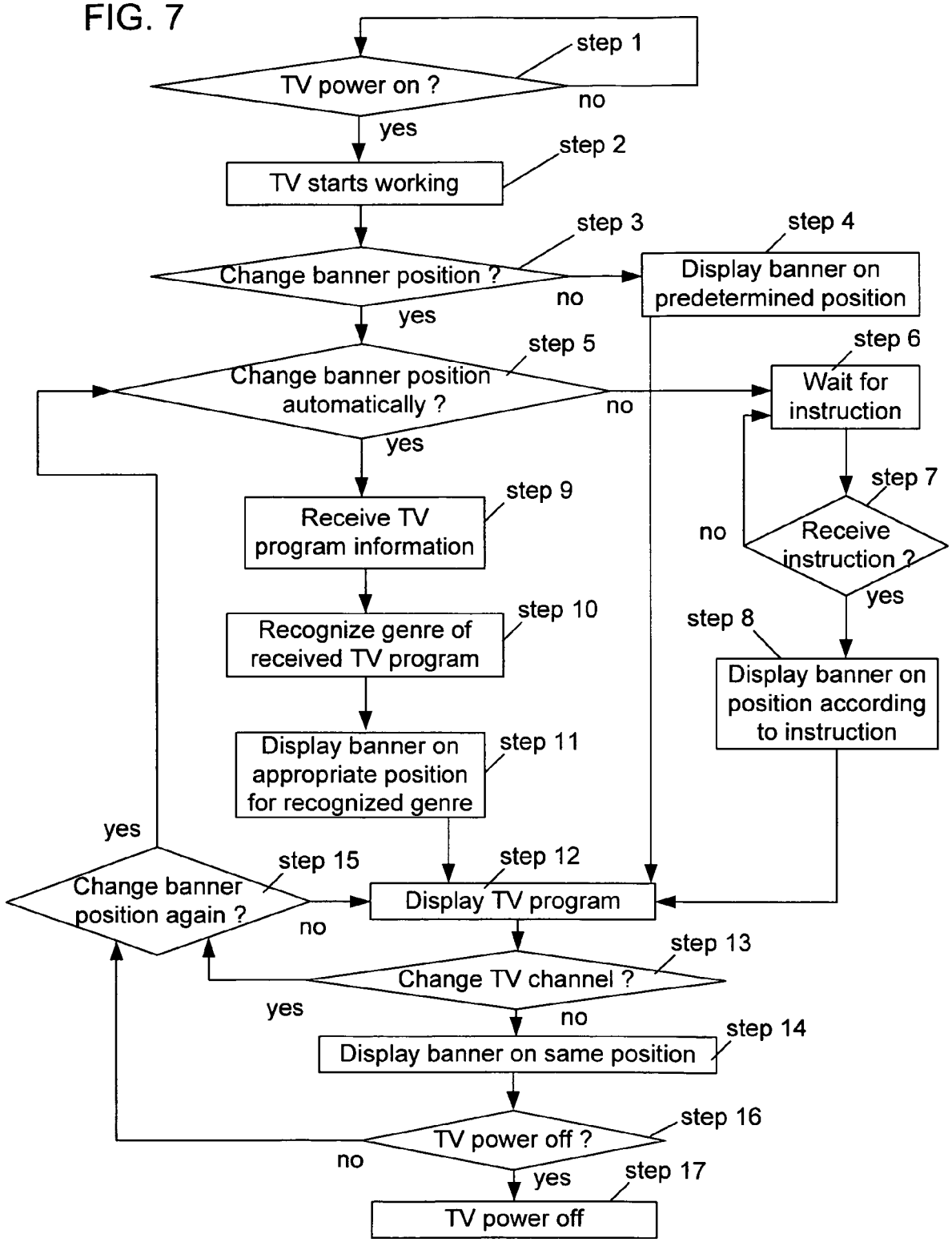
FIG. 7 is a flow chart illustrating an example of operations performed by a television receiver pertaining to the present invention.

Next, another operation performed by a television receiver pertaining to the present invention will be explained with reference to a flow chart of FIG. 7. In FIG. 7, step 1 through step 12 are the same as the operation illustrated in FIG. 4. When the banner is projected along width the television program image on the display in FIG. 7 (step 12), the controller determines if there is an instruction from a viewer to change the television channel or not (step 13). When the controller determines that there is an instruction to change the television channel, the controller determines whether the banner position is adjusted again or not base on the changed television channel (step 15). When the controller determines that the banner position is adjusted again, the controller determines again whether the banner position is adjusted automatically or not (step 5). When the controller determines that the banner position is not adjusted again based on television channel, which is changed, the banner position is not changed, and the banner is displayed on the same position with the changed program without changing the banner position (step 14).

Further, the controller determines whether to turn off the power of the television receiver or not (step 16). When the controller determines that the power of the television receiver is turned off, the power of the television receiver is turned off (step 17). When the controller determines not to turn off the television receiver, the controller determines whether to change the banner position again or not (step 15). As shown in FIG. 7, it is possible to set the television receiver to confirm the banner position again each time a viewer changes channels. Therefore, it is possible to avoid an adverse effect that the banner position is not on an appropriate position after changing the channels. In addition, the process for moving the banner to an appropriate position is not limited to the time immediately after the channel of the television receiver is changed. The process may be set at anytime. For example, the television receiver may be designed so that the controller determines again if the banner is set appropriately after a viewer has changed various setting on the television receiver.

As above, the present invention has been concretely described using a plurality of figures and flow charts. However, it goes without saying that the present invention is not limited to the examples above, but as far as an embodiment has an essential part of the present invention, the embodiment falls within the scope of rights of the present invention even if it is embodied in any configuration. For example, it is not limited to the television receivers that can be applied with the banner position adjustment function of the present invention. The banner position adjustment function may be applied to anything as long as a program is executed on a screen. For example, the present invention may be applied to any electric appliances other than television receivers, such as personal computers, video equipment, game consoles, and the like. Further, the number of the banner indicated on the display is not limited to one. The number of the banner may be two ore more. Further, FIGS. 4 through 7 explain the case where the banner position is determined before an image is projected on the display. However, the process to determine the banner position by the controller may be performed after the image is being projected on the display. In such a case, the banner may be indicated with a time lag after the image is projected on the display.

What is claimed is:

1. A television receiver comprising:
    a display; and
    a controller;
    wherein said display displays a television program having content,
    wherein said content contains text, the text conveying information pertaining to the content of the television program,
    wherein said display displays a banner,
    wherein the television program is categorized according to a genre, wherein said controller adjusts a position of the banner on said display such that the text is not obscured by the banner, and said controller adjusts a position of the banner on said display according to the genre, and wherein the banner is an advertisement related to the television program displayed on the display.

2. The television receiver according to claim 1, wherein the controller adjusts the position of the banner on the display as indicated by the television program.

3. The television receiver according to claim 2, wherein the advertisement is based on a name of the television program.

4. The television receiver according to claim 1, wherein the controller adjusts the position of the banner according to an instruction from outside of the television receiver.

5. The television receiver according to claim 4, further comprising:

a remote controller, which transmits the position of the banner to the controller.

6. The television receiver according to claim 1, wherein the controller recognizes an image ratio of a horizontal width to a vertical height on the display to determine the position of the banner.

7. The television receiver according to claim 6, wherein the controller moves the banner to a side of the display when the image ratio is about 4/3.

8. A television receiver comprising:

a display, which indicates a banner thereon; and a controller, which adjusts a position of the banner on the display;

wherein the controller receives a signal of a television program;

wherein the television program contains text, the text conveying information pertaining to the television program, wherein the controller categorizes the television program; and wherein the controller adjusts the position of the banner on the display according to the television program categorized so as to decrease interference with the television program displayed on the display, and adjusts the position of the banner on the display such that the text is not obscured by the banner.

* * * * *